(12) United States Patent
Mahapatra et al.

(10) Patent No.: US 7,821,448 B2
(45) Date of Patent: Oct. 26, 2010

(54) CONSTANT ALTITUDE PLAN POSITION INDICATOR DISPLAY FOR MULTIPLE RADARS

(75) Inventors: Pravas R. Mahapatra, Bangalore (IN); Vishnu V. Makkapati, Ongole (IN)

(73) Assignee: Honeywell International Inc., Morristown, NJ (US)

( * ) Notice: Subject to any disclaimer, the term of this patent is extended or adjusted under 35 U.S.C. 154(b) by 198 days.

(21) Appl. No.: 11/206,696

(22) Filed: Aug. 18, 2005

(65) Prior Publication Data

US 2006/0202886 A1 Sep. 14, 2006

(30) Foreign Application Priority Data

Mar. 10, 2005 (IN) .......................... 151/KOL/2005

(51) Int. Cl.
*G01S 13/89* (2006.01)
*G01S 13/95* (2006.01)

(52) U.S. Cl. .................... 342/179; 342/26 R; 342/26 D

(58) Field of Classification Search .................. 342/179
See application file for complete search history.

(56) References Cited

U.S. PATENT DOCUMENTS

| 3,769,442 | A | | 10/1973 | Heartz et al. |
|---|---|---|---|---|
| 4,002,827 | A | | 1/1977 | Nevin et al. |
| 4,547,803 | A | | 10/1985 | Richards |
| 4,697,185 | A | | 9/1987 | Thomas et al. |
| 4,931,801 | A | | 6/1990 | Hancock |
| 5,027,122 | A | | 6/1991 | Wieler |
| 5,036,326 | A | | 7/1991 | Andrieu et al. |
| 5,136,296 | A | * | 8/1992 | Roettger et al. ........... 342/26 D |
| 5,379,215 | A | * | 1/1995 | Kruhoeffer et al. ............ 702/3 |
| 5,440,483 | A | | 8/1995 | Badoche-Jacquet et al. |
| 5,519,401 | A | | 5/1996 | Farmer et al. |
| 5,530,450 | A | | 6/1996 | Sohn et al. |
| 5,554,992 | A | | 9/1996 | Toth et al. |
| 5,583,972 | A | * | 12/1996 | Miller ........................ 345/419 |
| 5,742,297 | A | | 4/1998 | Logan |
| 6,018,307 | A | | 1/2000 | Wakayama et al. |
| 6,064,388 | A | | 5/2000 | Reyzin |
| 6,140,955 | A | | 10/2000 | Andrusiak et al. |
| 6,211,814 | B1 | | 4/2001 | Benjamin et al. |
| 6,240,369 | B1 | * | 5/2001 | Foust ............................ 702/3 |

(Continued)

FOREIGN PATENT DOCUMENTS

JP   54043496 A   *   4/1979

(Continued)

OTHER PUBLICATIONS

Sugier, Jacqueline, "Common Software Library", Eumetnet Opera Programme. (Nov. 6, 2003), 65-66 pgs.*

(Continued)

*Primary Examiner*—Thomas H Tarcza
*Assistant Examiner*—Matthew M Barker
(74) *Attorney, Agent, or Firm*—Schwegman Lundberg & Woessner, P.A.

(57) ABSTRACT

A system and a method to receive radar data from a plurality of radars and to reduce the data from the plurality of radars to a common universal latitude-longitude coordinate frame. The plurality of radars may be positioned at separate geographical locations and may have one or more overlapping regions. The data may be combined in the one or more overlapping regions.

19 Claims, 12 Drawing Sheets

U.S. PATENT DOCUMENTS

| | | | |
|---|---|---|---|
| 6,255,981 | B1* | 7/2001 | Samaniego ............... 342/25 R |
| 6,272,433 | B2* | 8/2001 | Baron et al. ................... 702/3 |
| 6,307,500 | B1 | 10/2001 | Cornman et al. |
| 6,405,134 | B1* | 6/2002 | Smith et al. .................... 702/4 |
| 6,415,046 | B1 | 7/2002 | Kerut, Sr. |
| 6,573,855 | B1* | 6/2003 | Hayakawa et al. ............ 342/22 |
| 6,721,678 | B1* | 4/2004 | Zhang et al. ................ 702/145 |
| 6,771,207 | B1* | 8/2004 | Lang ........................ 342/26 R |
| 6,985,837 | B2* | 1/2006 | Moon et al. .................... 703/3 |
| 7,471,234 | B1* | 12/2008 | Lang ........................ 342/26 R |

OTHER PUBLICATIONS

SPRINT: Sorted Postion Radar Interpolation. National Center for Atmospheric Research. Boulder, CO. Jan. 1999. 76 pages.*

Doviak, R. J., et al., "Table of Contents", *Doppler Radar and Weather Observations, 2nd Edition*, San Diego, CA: Academic Press,(1993).

Mahapatra, P. R., et al., "Table of Contents", *Aviation Weather Surveillance System: Advanced Radar and Surface Sensors for Flight Safety and Air Traffic Management*, London, UK: IEE Press,(1999).

Watson, R. , et al., "Combining ground based meteroiligical radar data from multiple overlapping sites", *Proc. International Geoscience and Remote Sensing Symposium*, 3, Italy,(Jul. 1995),1660-1662.

Zhang, J. , et al., "Three-dimensional gridding and mosaic of reflectivities from the multiple wsr-88d radars", *Proc. 30th International Conference on Radar Meteorology*, Munich, Germany,(Jul. 2001),719-721.

"U.S. Appl. No. 11/235,047, Non-Final Office Action mailed Oct. 18, 2007", OARN,10 pgs.

"U.S. Appl. No. 11/235,047, Amendment and Response filed Jan. 18, 2008 to Office Action mailed Oct. 18, 2007", 13.

Sugier, Jacqueline , "Common Software Library", *EUMETNET OPERA Programme*, (Nov. 6, 2006),65-66 pgs.

"U.S. Appl. No. 11/235,047 Final Office Action mailed on Nov. 7, 2008", 15 pgs.

"U.S. Appl. No. 11/235,047, Non-Final Office Action mailed Apr. 2, 2009", 13 pgs.

"U.S. Appl. No. 11/235,047 Notice of Allowance Mailed Sep. 1, 2009", 8.

"U.S. Appl. No. 11/235,047, Final Office Action mailed on Nov. 7, 2008", 15 pgs.

"U.S. Appl. No. 11/235,047, Response filed Jul. 2, 2009 to Non Final Office Action mailed Apr. 2, 2009", 11 pgs.

* cited by examiner

CONSTANT ALTITUDE PLAN POSITION INDICATOR DISPLAY FOR MULTIPLE RADARS

CROSS REFERENCE TO RELATED APPLICATIONS

This application claims priority to India Patent Application No. 151/KOL/2005, filed Mar. 10, 2005, which is incorporated herein by reference.

BACKGROUND

Constant Altitude Plan Position Indicator (CAPPI) is a form of data presentation in weather radars. For CAPPI scanning, a horizontal slice is taken through the radar volume scan data at a constant altitude above the earth surface. The radar volume scan data is extracted from full 3-D scan data, and is converted to a 2-D format for presentation in polar coordinates on a computer display, paper printout, or any other two-dimensional surface.

CAPPI is a variant of the more general Plan Position Indicator (PPI) that displays weather parameters along radials from the radar as function of an azimuth scan angle. A radar antenna transmits and receives pulses at different elevation angles $\phi$ and at different azimuth angles $\theta$ by both performing a rotating scan operation in the azimuth and by varying the elevation angle. PPI data is generated and recorded by scanning a beam circularly at a constant elevation angle. A volume scan consists of multiple constant-elevation azimuth scans. PPI volume scan data at multiple elevation angles is used to produce CAPPI.

Near the radar site there is often ground clutter, which may interfere with obtaining a clean display of weather. In the beam position(s) with low elevation angle(s), clutter is often so strong that filtering the ground clutter also removes weather signals resulting in gaps in the weather display.

In PPI scanning, the radar beam may overshoot precipitation altitudes, for a part of the radial, and thereby not detect any precipitation at the corresponding ranges (i.e. distances from the radar).

Weather radar systems often deliberately degrade the time resolution for observation in order to improve signal quality and also to reduce the data handling specifications over long observation periods. The PPI volume scanning mode also degrades the spatial resolution by skipping certain elevation angles to reduce the time for scanning the region around the radar.

The maximum elevation of scan may be limited to a value less than 90° (i.e. vertical pointing), leaving a conical 'blind zone' over the radar location. This causes a circular hole to appear in the CAPPI, the hole being larger at higher altitudes.

Individual radars may be limited in their range coverage. To get a weather picture over a large geographical area, data may be combined from multiple radars that are spatially separated.

Combining CAPPI data from multiple radars may pose technical challenges. When a geographical area is covered by many radars, the coverage pattern is not uniform. Certain areas may not be covered at all (i.e. fall between coverage zones of individual radars), certain areas may have coverage only from a single radar, certain areas may have coverage from two radars, certain areas may be covered by three radars, and certain other areas may receive coverage from more than three radars. Such variability of coverage poses technical challenges in data combining.

DETAILED DESCRIPTION

CAPPI Data Generation

Figure 1:
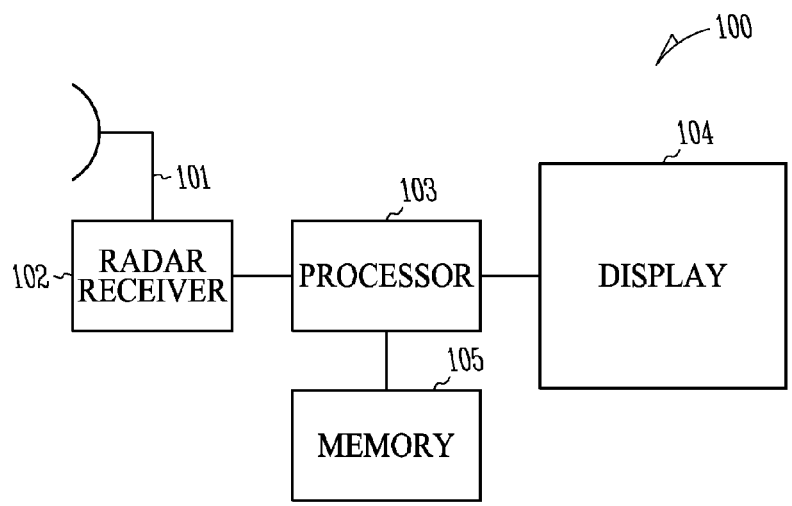
FIG. 1 illustrates a schematic radar system according to an example embodiment.

FIG. 1 illustrates a schematic radar system 100 according to an example embodiment. The radar system 100 includes an antenna 101 coupled to a radar receiver 102, a processor 103 coupled to the radar receiver 102, and a Plan Position Indicator (PPI) display 104 coupled with the processor 103. The processor 103 receives volume scan spherical coordinate data from the radar receiver 102, converts the radar data to rectangular coordinate data, and provides the rectangular coordinate data to the display 104. Additionally or alternatively, the processor 103 may receive the volume scan data recorded from a previous scan in a computer memory 105.

Figure 2:
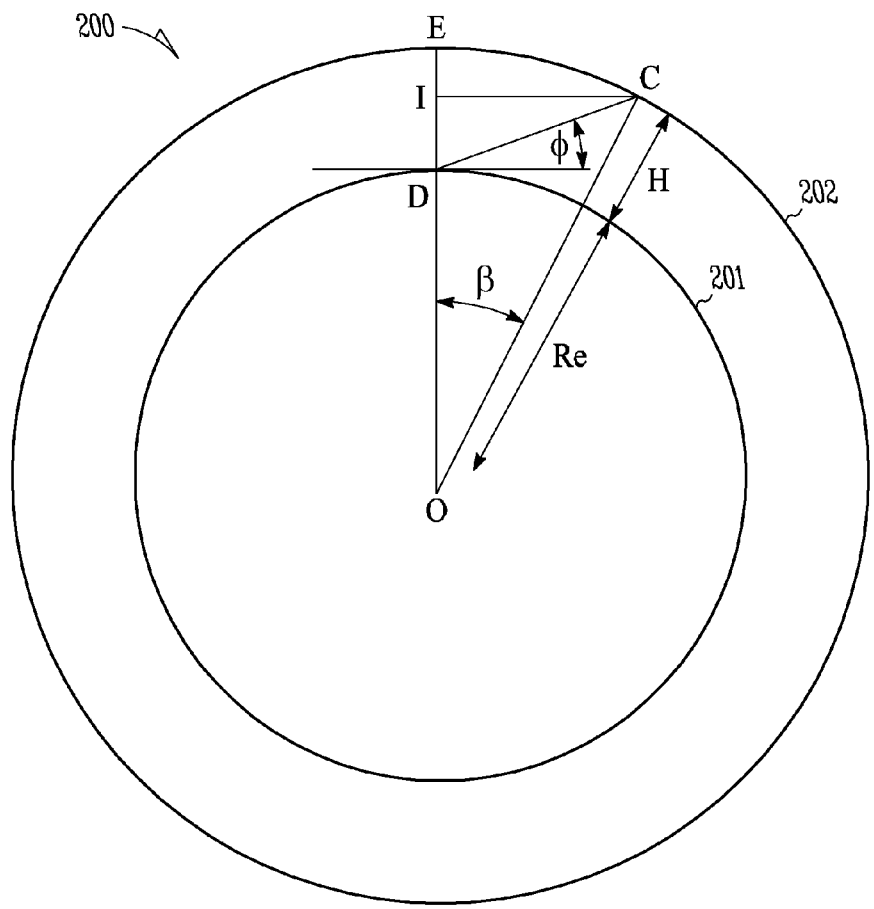
FIG. 2 illustrates a schematic cross-section of Earth and a surface at a constant altitude above the earth's surface at which Constant Altitude Plan Position Indicator (CAPPI) data is generated according to an example embodiment.

FIG. 2 illustrates a schematic cross-section 200 of Earth 201 and a surface 202 having a constant altitude H above the earth's surface at which Constant Altitude Plan Position Indicator (CAPPI) data is generated according to an example embodiment. An origin of the radar antenna 101 is represented at point D on the earth's surface. The center of the Earth is represented by O. The Earth's radius is represented by $R_e$. Point C represents the point at which the CAPPI data may be generated at the altitude H. The angle at the earth's center between point D and point C is represented by $\beta$. The point E is directly above point D at the altitude H.

An elevation angle $\phi$ represents the angle at point D between the earth's surface (i.e. a tangent to the Earth's surface at point D) and the line CD. The specific elevation angle $\phi$ may have been skipped during the radar scan operation. In an example embodiment, gaps such as this may be filled using an interpolation scheme to potentially provide spatially continuous information of weather at the given altitude H. The elevation angle φ of the radar is computed for each increment in EC using equation set (2) and FIG. 2.

$$\beta = \frac{EC}{R_e + H} \quad (2)$$

$$CI = (R_e + H)\sin(\beta)$$

$$OI = (R_e + H)\cos(\beta)$$

$$ID = (R_e + H)\cos(\beta) - R_e$$

$$CD = \sqrt{CI^2 + ID^2}$$

$$\phi = \tan^{-1}\left(\frac{ID}{CI}\right)$$

Because the Earth is curved and the scan elevation interval may be between a minimum value and a maximum value, a point such as point C in FIG. 2 on the CAPPI surface may have an elevation angle φ outside the scanned elevation interval (or in between two scanned elevation angles). For altitudes on the CAPPI surface that are below the minimum scan elevation, the data may be taken from the lowest elevation angle available. Conversely, if a selected point C is above the maximum scan elevation, the data may be taken from the highest elevation angle available.

Embodiments may account for bending of the radar beam. The radar beam may bend as it passes through layers of air with different refractive indices. Under standard atmospheric conditions, the bending of the radar beam has a radius of curvature about four times the radius of the Earth. Thus, under normal conditions, a radar beam emitted horizontally and at other elevations would take paths that curve slightly below straight line paths.

Figure 3:
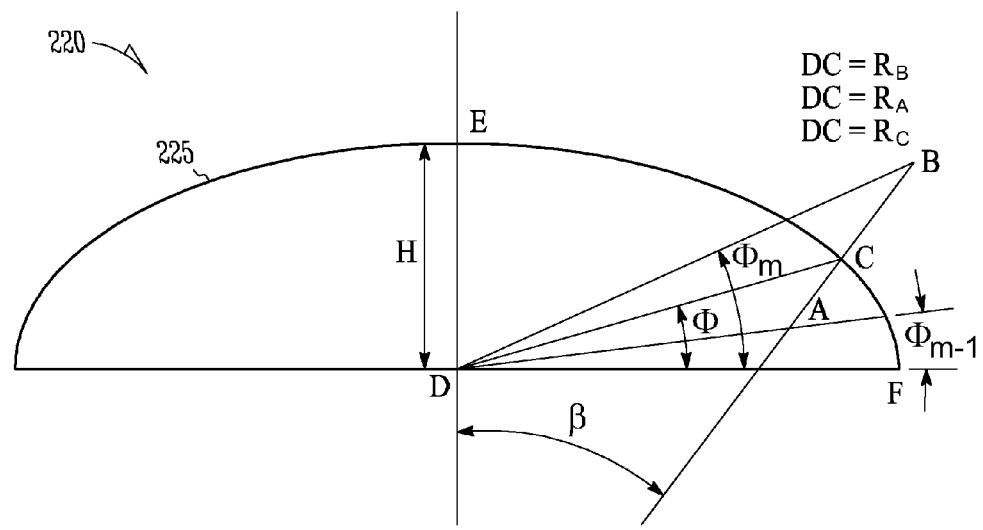
FIG. 3 illustrates a schematic partial cross-section of CAPPI geometry in a vertical section above a plane tangent to the Earth at the radar location, as employed in an example embodiment.

FIG. 3 illustrates a schematic partial cross-section of CAPPI geometry 220 in a vertical section above a plane tangent to the Earth at the radar location D, as employed in an example embodiment. The horizontal line through D is the tangent to the Earth's surface at point D and the arc 225 represents the spherical surface, at a height H above the radar location D, at which Constant Altitude Plan Position Indicator (CAPPI) data is generated according to an additional example embodiment.

In a volume scanning mode, an elevation angle φ of the antenna 101 is changed incrementally by a determined angle and a horizontally rotating scanning operation is performed along each incremented elevation angle. CAPPI data for point C may not be readily available in the volume scan data, and may be constructed from radar data gathered along other elevation angles and/or azimuth angles, in embodiments of the present invention. The CAPPI data at point C may be generated by interpolating the gathered radar data in elevation. Elevation angles $\phi_m$ and $\phi_{m-1}$ denote the elevation angles of the radar scan that are closest to angle φ, on either side, as shown in FIG. 3. The weather parameter (e.g. reflectivity Z) at the point C, having elevation φ, may be calculated as the weighted average of radar resolution cell data from points A and B, having elevations $\phi_{m-1}$ and $\phi_m$, respectively, in an embodiment.

In FIG. 3, the distance from point D to point B (DB) may be represented as $R_B$, the distance from point D to point A (DA) may be represented as $R_A$, and the distance from point D to point C (CD) may be represented as $R_C$. In embodiments, the CAPPI construction includes two processes. The first process includes a mechanism to generate CAPPI scan line data of a weather parameter Z. For a specified CAPPI altitude, the two bounding radials $\phi_{m-1}$ and $\phi_m$ (i.e. the value of m), the interpolation weight between them, and the ranges CD, DB and DA depend on the length of the arc EC alone, and are independent of the azimuth angle θ.

In the example embodiments, the CAPPI scan line data is generated by keeping EC constant and varying the azimuth angle θ of the radar from 0 to 2π (or a certain $\theta_{min}$ to $\theta_{max}$ for a sectoral CAPPI) clockwise or counter-clockwise depending on the direction of the radar scan. As discussed in more detail with regard to the process of FIGS. 8A, 8B, 8C, after completing the circular arc at a constant arc length EC, the arc length EC may be incremented by 1 km (or any other determined step, increment or unit) and the azimuth angle θ may varied again from 0 to 2π (or $\theta_{min}$ to $\theta_{max}$).

In the second step of the CAPPI construction, the CAPPI scan line data is presented to the PPI coordinate conversion, formatting and display mechanism.

Figure 4:
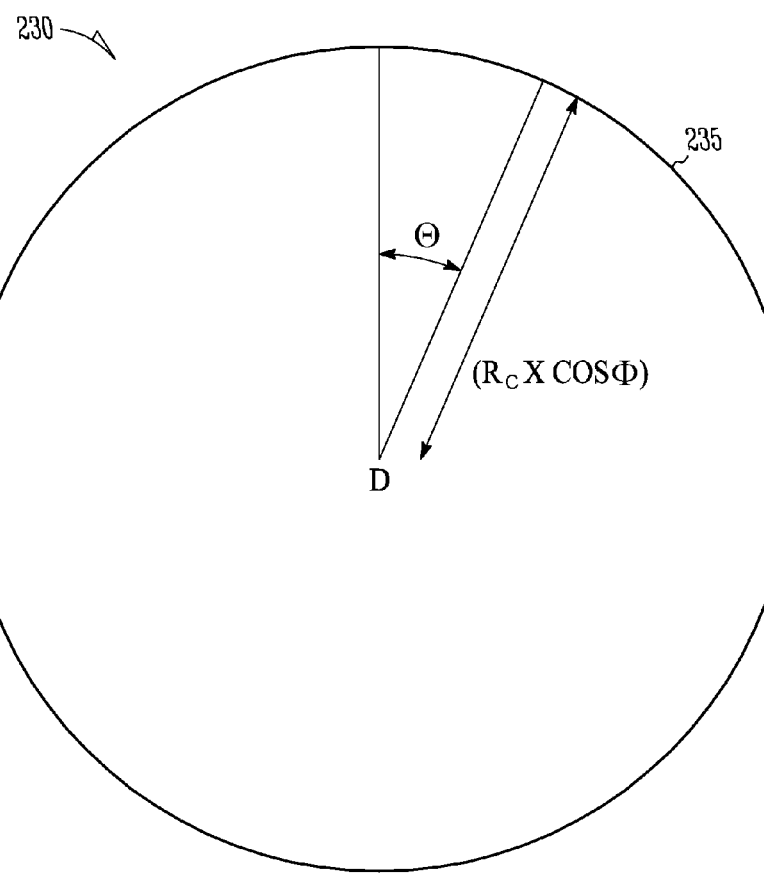
FIG. 4 illustrates a schematic plan view of an area around the radar showing a constant-range circle over which CAPPI data is generated according to an example embodiment.

FIG. 4 illustrates a schematic plan view 230 of an area around the radar showing a horizontal projection of a constant-range circle 235 over which CAPPI data is generated according to an example embodiment. The circle 235 includes a radius of $(R_c)(\cos \phi)$. This radius is the horizontal component of the range shown as the line segment CD in FIG. 3. The CAPPI scan data may display weather conditions occurring over any given constant-height surface within a half-spherical observation volume of the radar. The CAPPI data may be generated about the radar origin D over azimuth angle θ from 0° ≦θ≦360°. The azimuth angle θ may be incremented by 1° or by any other angular increment as specified in the radar data in the CAPPI generation.

Latitude-Longitude Coordinate System

Figure 5:
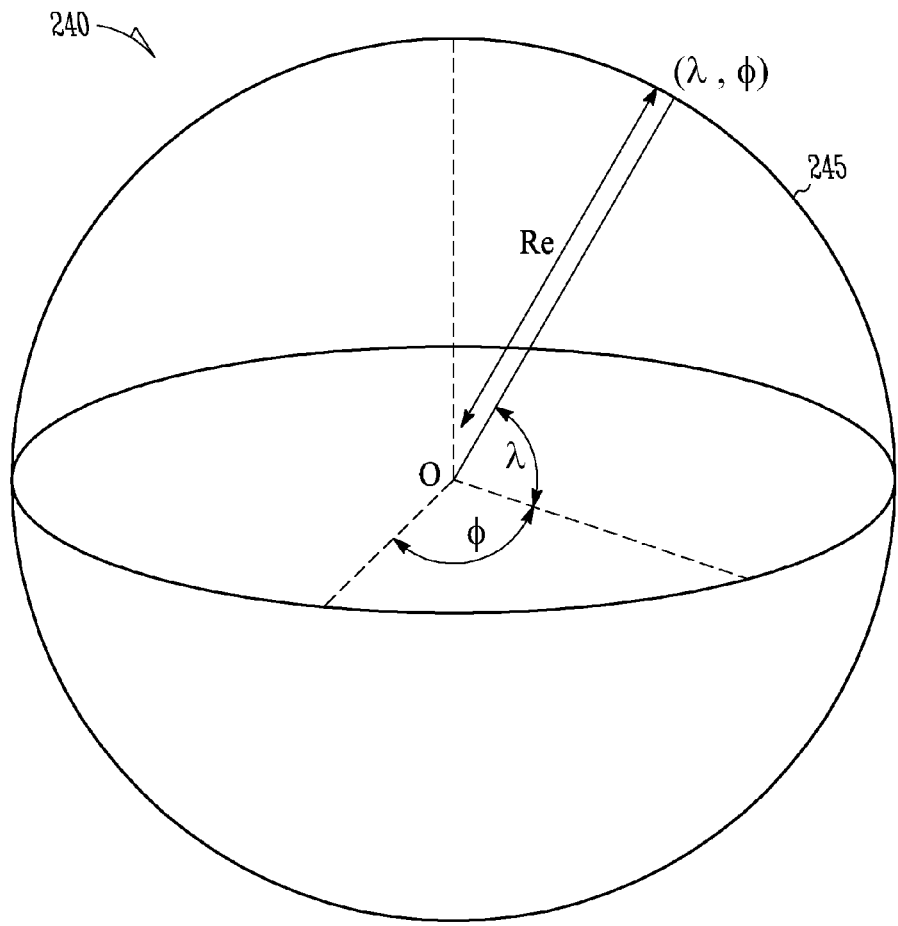
FIG. 5 illustrates a latitude-longitude coordinate system according to an embodiment.

FIG. 5 illustrates a latitude-longitude coordinate system 240 according to an embodiment. The latitude-longitude coordinate system offers a grid for mosaicing CAPPI data from overlapping radars at various altitudes.

The CAPPI radar data may be converted from the individual radar coordinates to a universal grid system as follows. Let $R_e$ denote the radius of the earth and H be the altitude above the Earth's surface 245 at which the mosaic is to be constructed. Coordinate $(\lambda_{min}, \phi_i)$ may be the latitude-longitude location of the radar i on the earth's surface 245.

Coordinates $((\lambda_{min_i}, \phi_{min_i}), (\lambda_{max_i}, \phi_{max_i}))$ of the Minimum Bounding Rectangle (MBR) of radar coverage (e.g. the bounds of the coverage of radar i) may be calculated as $$\Delta\lambda = \cos^{-1}\left(\frac{R_e}{R_e + H}\right) \quad (7)$$

$$\Delta\phi_i = \sin^{-1}\left(\frac{\sin(\Delta\lambda)}{\cos(\lambda_i)}\right)$$

$$\lambda_{min_i} = \lambda_i - \Delta\lambda; \lambda_i + \Delta\lambda$$

$$\phi_{min_i} = \phi_i - \Delta\phi_i; \phi_{max_i} = \phi_i + \Delta\phi_i$$

The coordinates $((\lambda_{min}, \phi_{min}), (\lambda_{max}, \phi_{max}))$ of the MBR for N radars may be calculated as arguments of the minimum and maximum values, respectively, where i=1, 2, ... N.

$$\lambda_{min} = \arg\min_{i=1,2,\ldots,N} \lambda_{min_i}$$

$$\lambda_{max} = \arg\max_{i=1,2,\ldots,N} \lambda_{max_i}$$

$$\phi_{min} = \arg\min_{i=1,2,\ldots,N} \phi_{min_i}$$

$$\phi_{max} = \arg\max_{i=1,2,\ldots,N} \phi_{max_i} \quad (8)$$

A distance d between two latitude-longitude points $(\lambda_1, \phi_1)$ and $(\lambda_2, \phi_2)$ may be calculated as $$d((\lambda_1,\phi_1),(\lambda_2,\phi_2)) = R_e \cos^{-1}(\cos(\lambda_1)\cos(\lambda_2)\cos(\phi_1-\phi_2)+\sin(\lambda_1)\sin(\lambda_2)) \quad (9)$$

Mosaic For Multiple Radars

Figure 6:
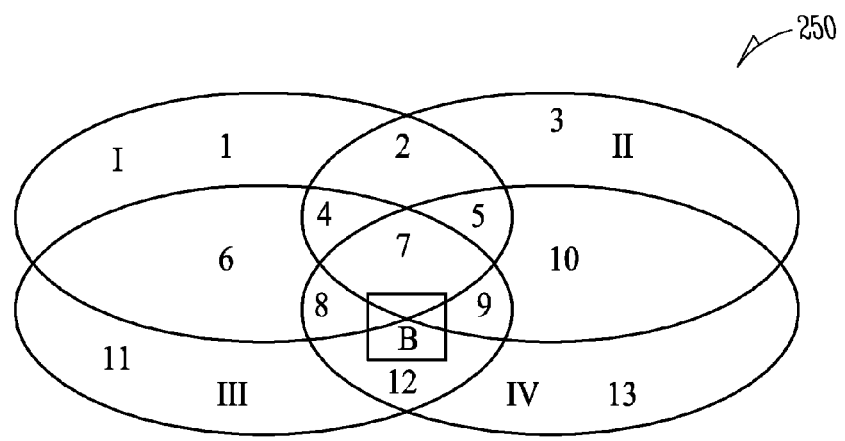
FIG. 6 illustrates a radar mosaic system at which Constant Altitude Plan Position Indicator (CAPPI) data is generated for overlapping radars according to an example embodiment.

FIG. 6 illustrates a radar mosaic 250 at which Constant Altitude Plan Position Indicator (CAPPI) data is generated for overlapping radars according to an example embodiment. The radar mosaic 250 includes overlapping radars I, II, II and IV in this illustrated embodiment. There may be any number N of radars associated with the mosaic, and may not be limited to 4 or may be less than 4.

In this embodiment, there are 13 separate regions in the mosaic 250. The regions along with the overlapping radars are shown in Table I. Table I is indexed by region and shows the corresponding radars in that particular region. The region may or may not have overlapping radars. In the instance where there are at least two radars covering the region, there are overlapping radars. In the regions covered by three radars (e.g. regions 4, 5, 8, 9) or more than three radars (e.g. region 7), a three dimensional wind vector may be constructed. A two dimensional wind vector may be constructed for a region with two overlapping radars (e.g. regions 2, 6, 10, 12).

TABLE I

| Region | Observing Radar(s) |
|---|---|
| 1 | I |
| 2 | I and II |
| 3 | II |
| 4 | I, II, and III |
| 5 | I, II, and IV |
| 6 | I and III |
| 7 | I, II, III, and IV |
| 8 | I, III, and IV |
| 9 | II, III, and IV |
| 10 | II and IV |
| 11 | III |
| 12 | III and IV |
| 13 | IV |

Flowcharts

Figure 7:
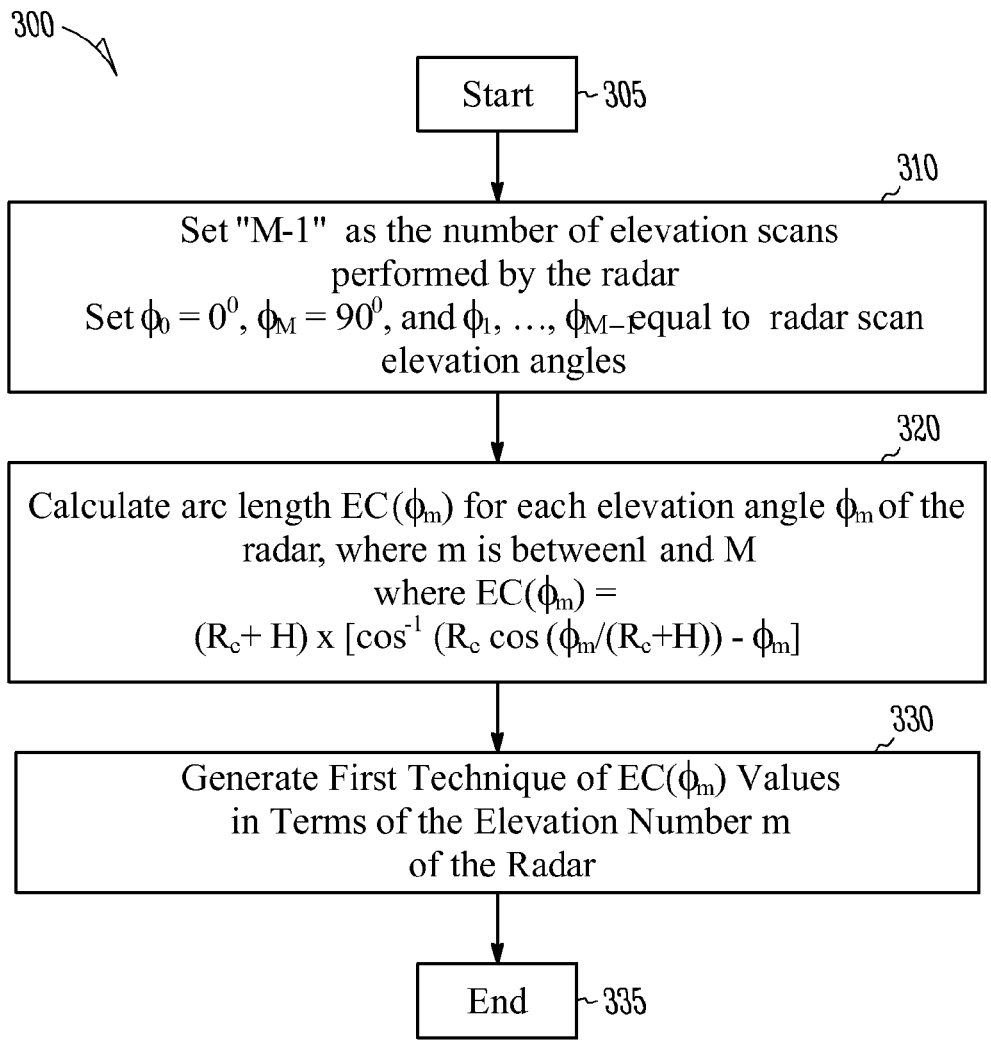
FIG. 7 illustrates a process of generating a mechanism, such as look up tables, according to an example embodiment.

FIG. 7 illustrates a process 300 of generating a mechanism, such as look up tables, according to an example embodiment. The process 300 includes the first of the two processes discussed with regard to FIG. 3.

At block 305 of FIG. 7, the process begins. At block 310, a value of M is selected such that M-1 equals the number of elevation scans performed by the radar 102. In embodiments of the process, set $\phi_0$ equal to zero, set $\phi_M$ equal to 90°, and the angles $\phi_1$ through $\phi_{M-1}$ equal respectively to the radar scan elevation angles from the lowest to the highest along the determined increments.

At block 320, an arc length EC ($\phi_m$) may be calculated for each elevation angle $\phi_m$ of the radar. The interval for the elevation number m may be: $0 \leq m < M$. The elevation number m may be incremented, by 1, for example, in the interval. The arc length EC may be calculated for each elevation angle $\phi_m$ with the formula:

$$EC(\phi_m) = (R_e + H) \times [\cos^{-1}(R_e \cos(\phi_m)/(R_e + H)) - \phi_m].$$

At block 330, a first mechanism of EC($\phi_m$) values in terms of the elevation number m of the radar may be generated using the values generated at block 320. The first mechanism may be a look up table indexed by elevation number m and/or elevation angle $\phi_m$, a graph, an algorithm, a chart, and/or any other possible mechanism.

At block 335, the process of generating the first mechanism ends.

Figure 8A:
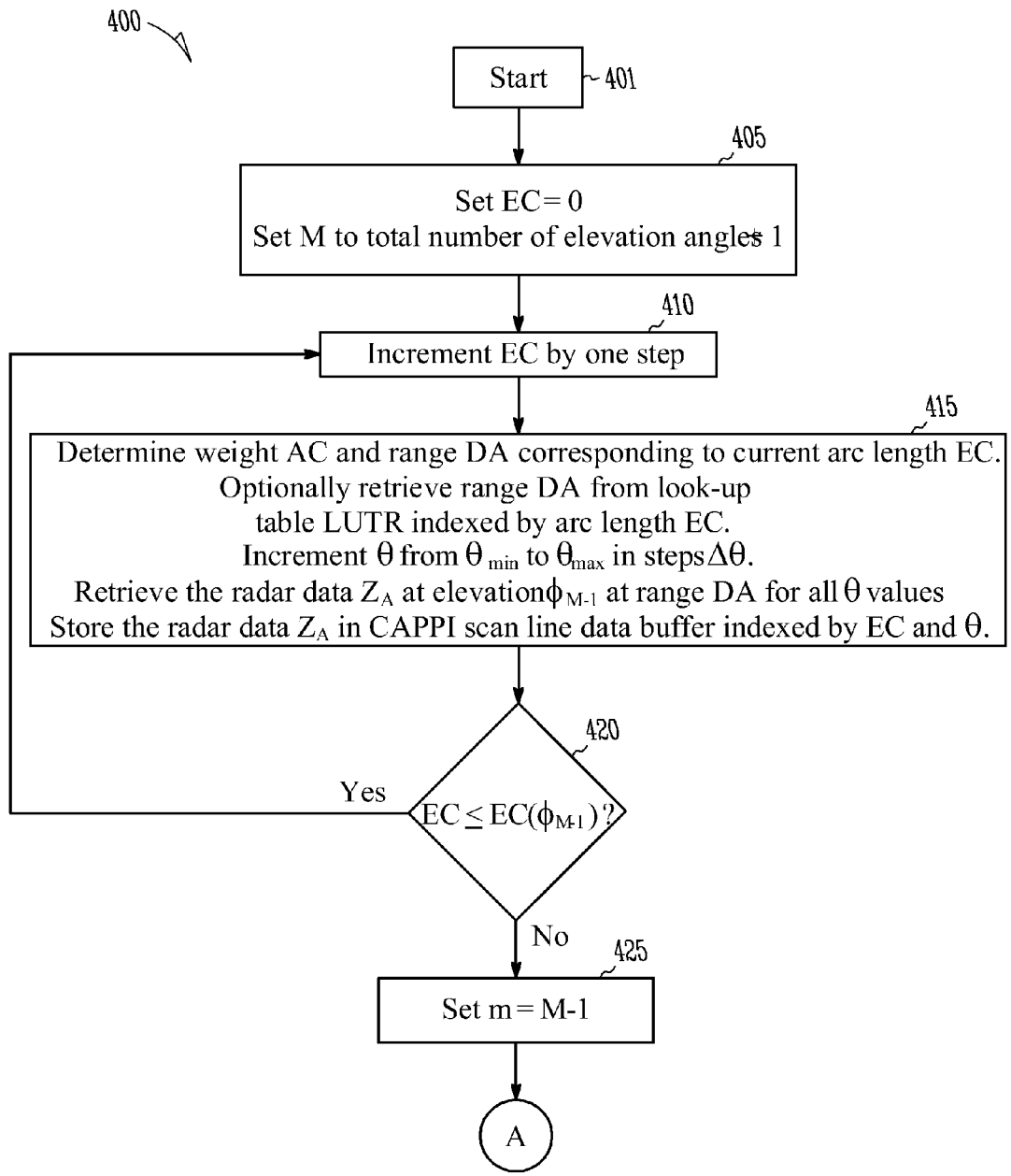
FIGS. 8A, 8B and 8C illustrate a process of generating CAPPI data using the mechanism generated in FIG. 7 according to an embodiment.
Figure 8B:
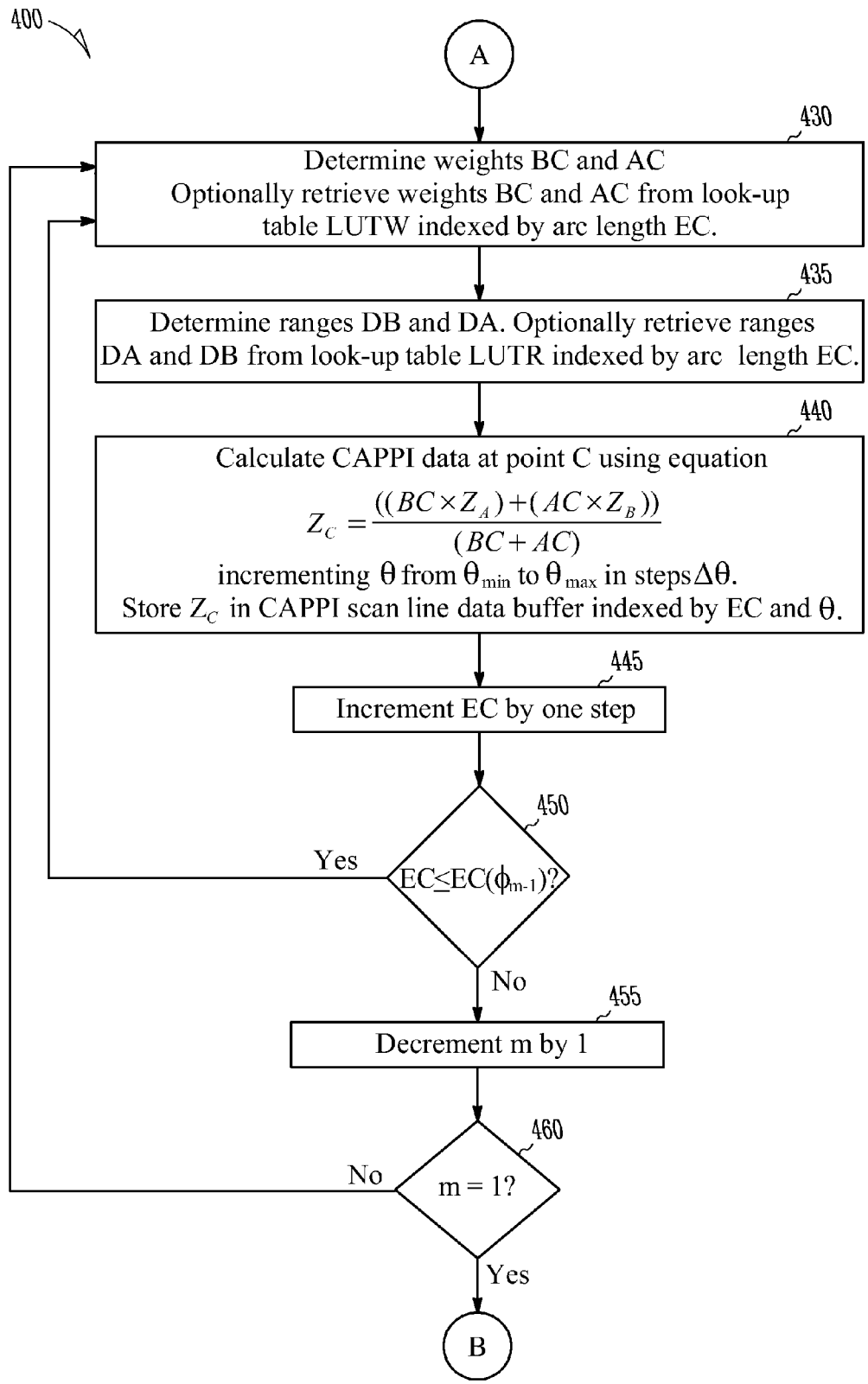
Figure 8C:
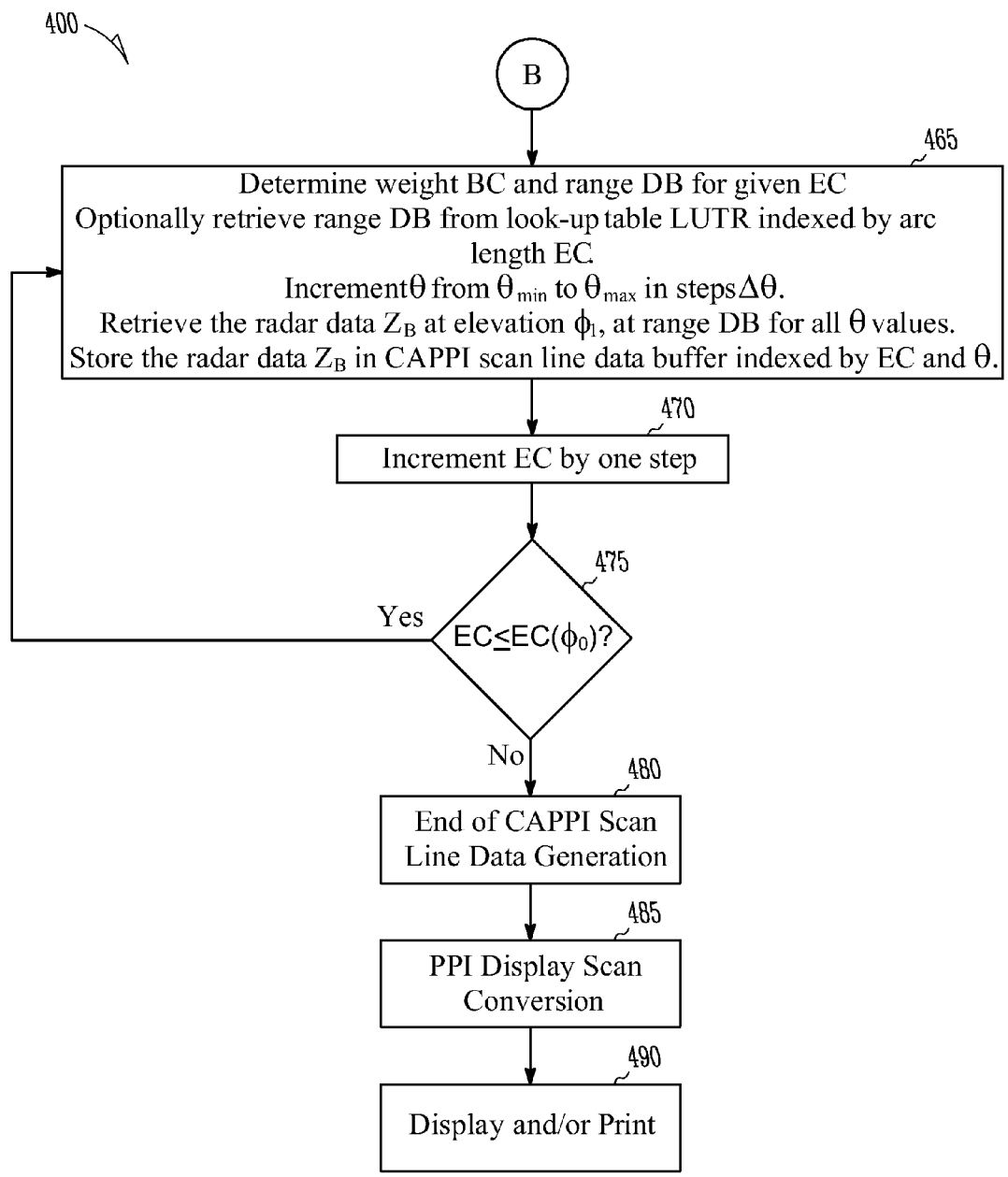

FIGS. 8A, 8B, and 8C illustrate a process 400 of generating CAPPI data using the mechanisms generated in FIG. 5 according to an example embodiment.

At block 401, the process 400 of FIG. 8A begins.

At block 405, the process 400 sets the value of the arc length EC, illustrated in FIG. 3, to zero. The value of M is set to one more than the number of total scan elevation angles $\phi$ in the radar volume scan data set.

At block 410, the length EC is incremented by one step, which may be one (1) km or any other chosen value.

At block 415, the range CD and the corresponding angle $\phi$ may be calculated using equation (2). The range AC may be calculated using the equation: AC=CD×sin($\phi-\phi_{M-1}$)/(cos($\phi_{M-1}+\beta$)). The range DA may be calculated by solving for DA in the equation:

$$\frac{1}{17000}(DA)^2 \cos^2(\phi_{M-1}) + (DA)\sin(\phi_{M-1}) = H - (AC).$$

Optionally, for a given radar and scan cycle, instead of calculating the range DA, the values of range DA may be read from a pre-stored mechanism, such as a pre-stored look-up table LUTR, of range DA indexed by arc length EC. The pre-stored mechanism may be from a previous computation of the range DA for the same CAPPI altitude.

The azimuth angle θ may be incremented from $\theta_{min}$ to $\theta_{max}$ in steps of Δθ, where Δθ may be any degree, such as 1 degree. The radar data $Z_A$ may be retrieved at range DA, from the original scan data at elevation $\phi_{M-1}$, for all θ values. The radar data $Z_A$ may be stored in a CAPPI scan line data buffer indexed by arc length EC and azimuth angle θ.

At block 420, the process 400 is queried as to whether EC is less than or equal to EC($\phi_{M-1}$). If the answer to the query is 'yes' then the process may proceed to block 410. If the answer to the query is 'no', then the process may proceed to block 425.

At block 425, m may be initialized to M-1 and the process may proceed to block 430 in FIG. 8B.

At block 430, the weights BC and AC may be calculated using the equations BC=CD×sin($\phi_m-\phi$)/(cos($\phi_m+\beta$)) and AC=CD×sin($\phi-\phi_{m-1}$)/(cos($\phi_{m-1}+\beta$)), where CD and $\phi$ are obtained using equation (2). Optionally, for a given radar and scan cycle, the values of weights BC and AC may be read from a pre-stored mechanism, such as a pre-stored look-up table LUTW, from a previous computation of BC and AC for the same CAPPI altitude.

At block 435, determine ranges DB and DA solving for DB and DA in the equations:

$$\frac{1}{17000}(DB)^2 \cos^2(\phi_m) + (DB)\sin(\phi_m) = H + (BC) \text{ and}$$

$$\frac{1}{17000}(DA)^2 \cos^2(\phi_{m-1}) + (DA)\sin(\phi_{m-1}) = H - (AC),$$

respectively. Optionally, for a given radar and scan cycle, the values of ranges DB and DA may be read from a pre-stored mechanism, such as the look-up table LUTR indexed by arc length EC, from a previous computation of ranges DB and DA for the same CAPPI altitude.

At block 440, CAPPI data is calculated at point C. Weather data $Z_A$ may be retrieved from the radar volume scan data for elevation $\phi_{m-1}$ and range DA. Weather data $Z_B$ may be retrieved for elevation $\phi_m$ and range DB from the radar volume scan data. The weather data $Z_C$ at CAPPI data point C is the interpolation of $Z_A$ and $Z_B$ with weights BC and AC, and may be calculated according to the equation $$Z_C = \frac{((BC \times Z_A) + (AC \times Z_B))}{(BC + AC)}.$$

At block 445, the length EC is incremented by one step.

At block 450, the process is queried as to whether EC is less than or equal to $EC(\phi_{m-1})$. If the answer to the query is 'yes' then the process may proceed to block 430. If the answer to the query is 'no', then the process may proceed to block 455.

At block 455, m is decremented by 1.

At block 460, the process is queried as to whether m is equal to 1. If the answer to the query is 'no' then the process may proceed to block 430. If the answer to the query is 'yes', then the process proceeds to block 465. The process may proceed to block 465 in FIG. 8C.

At block 465, for a given arc length EC, calculate weight BC using the equation $BC = CD \times \sin(\phi_1 - \phi)/(\cos(\phi_1 + \beta))$, then solve for range DB using the equation:

$$\frac{1}{17000}(DB)^2 \cos^2(\phi_1) + (DB)\sin(\phi_1) = H + (BC).$$

Angle $\theta$ may be incremented from $\theta_{min}$ to $\theta_{max}$ in steps of $\Delta\theta$. The radar data $Z_B$ at range DB may be retrieved from the scan data at elevation $\phi_1$, for all $\theta$ values. The radar data $Z_B$ may be stored in CAPPI scan line data buffer indexed by length EC and angle $\theta$. Optionally, for a given radar and scan cycle, the values of DB may be read from the pre-stored mechanism, such as the pre-stored look-up table LUTR indexed by EC, from a previous computation of range DB for the same CAPPI altitude.

At block 470, the length EC is incremented by one step.

At block 475, the process is queried as to whether EC is less than or equal to $EC(\phi_0)$ at $\phi_0 = 0°$. If the answer to the query is 'yes' then the process proceeds to block 465. If the answer to the query is 'no', then the process proceeds to block 480.

At block 480, CAPPI scan line data generation ends.

At block 485, PPI display scan conversion occurs, as described herein. PPI scan converted CAPPI scan line data may be obtained and stored.

At block 490, the generated CAPPI radar data $Z_C$ along the surface 202 at the altitude H above the earth's surface may be displayed on the display 104 and/or printed.

Superposition of Scalar Data

Figure 9A:
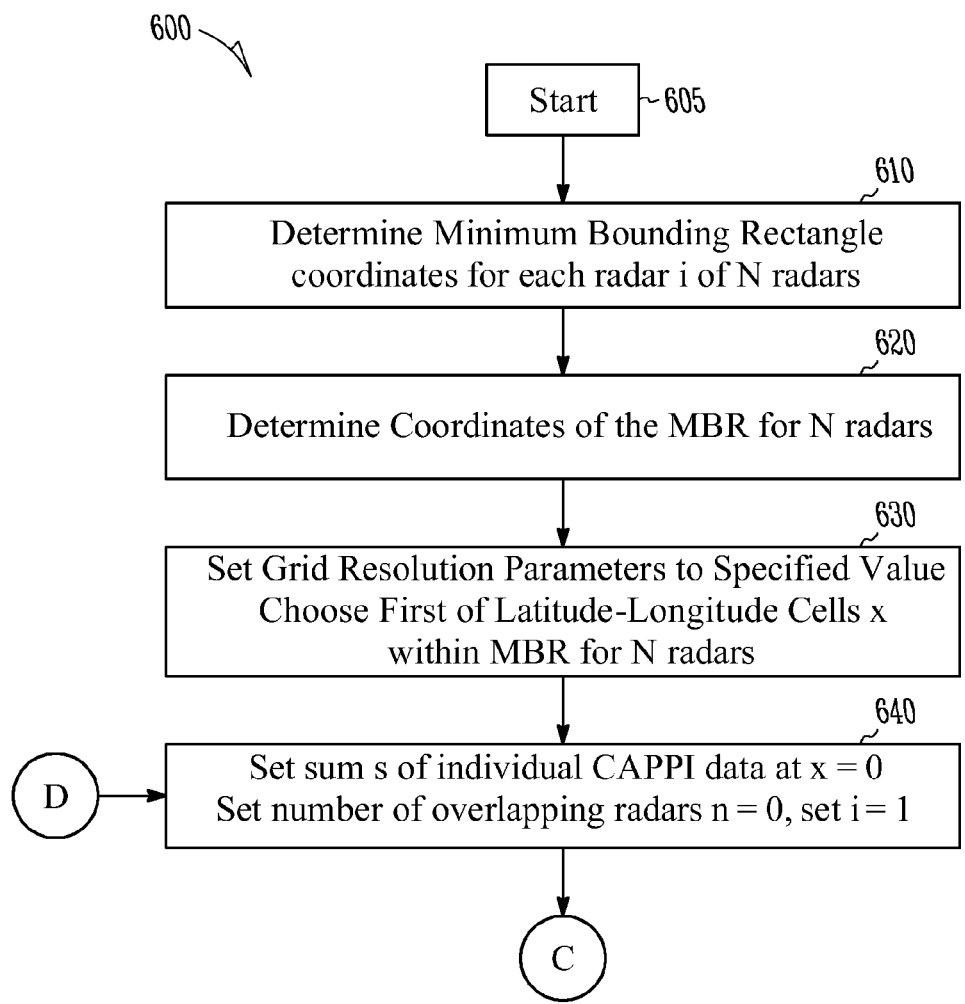
FIGS. 9A and 9B illustrate a process of extracting scalar data according to an embodiment.
Figure 9B:
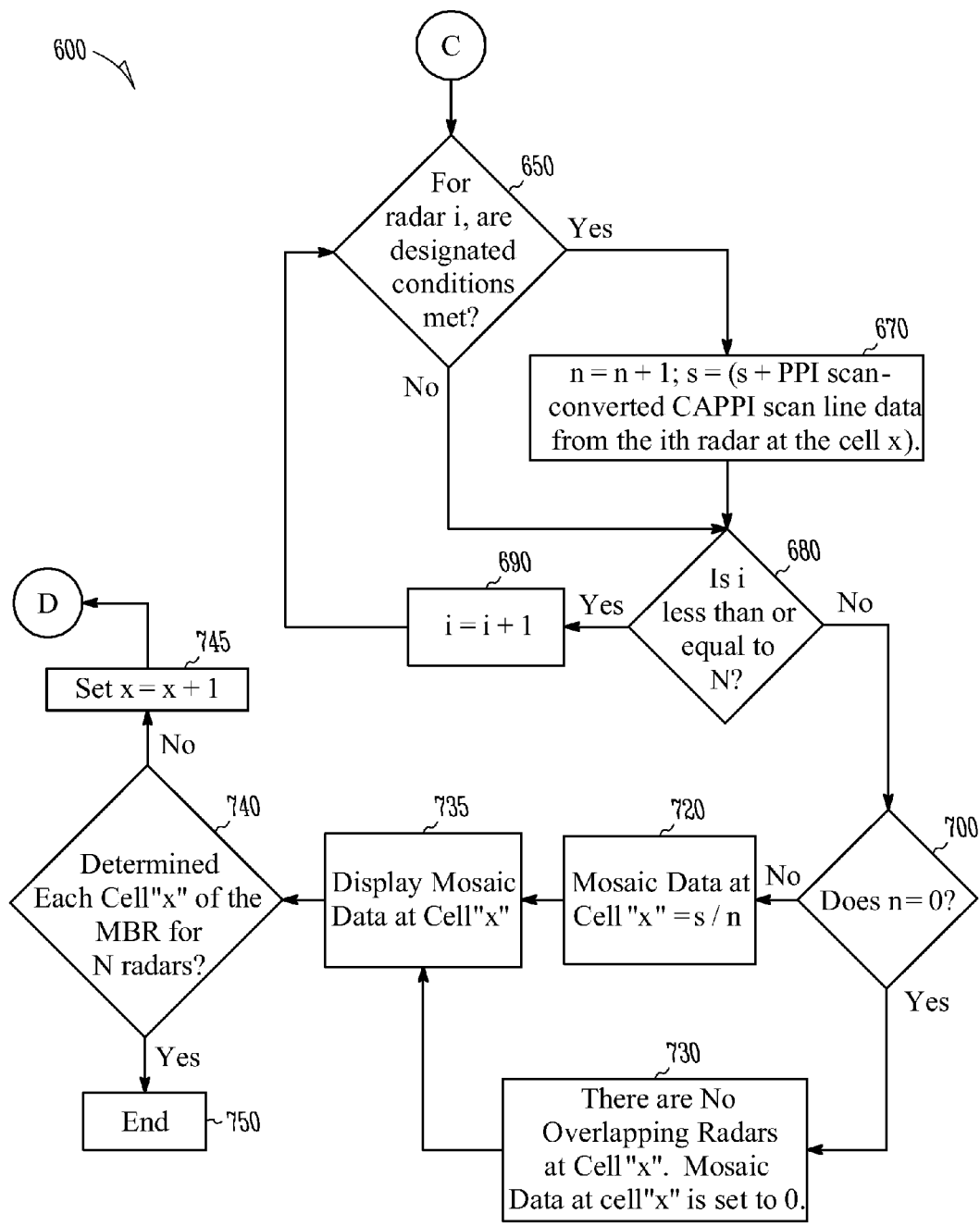

FIGS. 9A and 9B illustrate a process 600 of extracting scalar data according to an embodiment. The overlapping radars at a point, as shown in FIG. 6, may be determined dynamically. For scalar data, the average or maximum of the values for the overlapping radars at the point may be calculated and displayed at that point.

The process 600 for constructing the mosaic of scalar data with data from N radars may begin at block 605.

At block 610 the Minimum Bounding Rectangle (MBR) coordinates $((\lambda_{min_i}, \phi_{min_i}), (\lambda_{max_i}, \phi_{max_i}))$ may be determined for radar i ($1 \leq i \leq N$) using equation (7).

At block 620, coordinates associated with the MBR for N radars $((\lambda_{min}, \phi_{min}), (\lambda_{max}, \phi_{max}))$ may be determined using equation (8).

At block 630, grid resolution parameters (dimensions of latitude-longitude cell) $\delta\lambda$ and $\delta\phi$, may be set to any specified value. The latitude-longitude cell of dimension $\delta\lambda$ and $\delta\phi$ at location $(\lambda_{min}, \phi_{min})$ is chosen as the first of the latitude-longitude cells x within the MBR for N radars, obtained in block 620.

At block 640, a sum s of individual CAPPI data at x, from all weather radars observing cell x, is set to zero. A number of overlapping radars n is set to zero. The radar index i is set to 1. The index of cell x is set to 1.

At block 650, the process 600 queries as to whether designated conditions are met for radar i. If the answer to the query is no, the process proceeds to block 680 with s and n held at their current values. If the answer to the query is yes, the process proceeds to block 670.

For the latitude-longitude cell x at coordinates ($\lambda$, $\phi$), the designated conditions include first checking if the inequality $\lambda_{min_i} \leq \lambda \leq \lambda_{max_i}$ is true, if yes then checking if the inequality $\phi_{min_i} \leq \phi \leq \phi_{max_i}$ is satisfied, and if yes, then further checking if the inequality $d((\lambda,\phi), (\lambda_i,\phi_i)) < EC_i(0°)$ is satisfied, where $EC_i(0°)$ may be retrieved from the first mechanism of CAPPI for the $i^{th}$ radar generated at block 330 in FIG. 7.

At block 670, the number of overlapping radars n is set to n+1. The sum of weather data s is set to (s+PPI scan-converted CAPPI scan line data from the $i^{th}$ radar at the cell x). The PPI scan-converted CAPPI scan line data from the $i^{th}$ radar at the cell x may be obtained by first computing the east-west distance $d_{EWi}$ and north-south distance $d_{NSi}$ using the formulae $d_{EWi} = d((\lambda_i,\phi), (\lambda_i,\phi_i))$ and $d_{NSi} = d((\lambda,\phi_i), (\lambda_i,\phi_i))$ respectively, of x from the $i^{th}$ radar location. The PPI scan converted data obtained and stored at block 485 of FIG. 8C, corresponding to the coordinates closest to $d_{EWi}$ and $d_{NSi}$, may be read. In case of reflectivity data, the data is converted from a logarithmic dBZ scale to a linear scale Z given by $Z = 10^{dBZ/10}$.

At block 680, the process 600 is queried as to whether radar index i is less than or equal to the number of radars N. If the answer to the query is yes, the process proceeds to block 690. If the answer to the query is no, the process proceeds to block 700.

At block 690, the radar index i may be set to i+1. The process then proceeds to block 650 such that determinations may be made for each radar i.

At block 700, the process is queried as to whether the number of overlapping radars n is equal to zero. If the answer to the query is no, the process proceeds to block 720. If the answer to the query is yes, the process proceeds to block 730.

At block 720, weather data at cell x having coordinates ($\lambda$, $\phi$), may be set to the sum s of individual radar CAPPI data, divided by the number of overlapping radars n. The process may proceed to block 735.

At block 730, there are no overlapping radars at cell x ($\lambda$, $\phi$), and the weather/mosaic data at cell x ($\lambda$, $\phi$), may be set to zero. The process may proceed to block 735.

At block 735, weather data for cell x, at ($\lambda$, $\phi$), may displayed against the coordinates $\lambda$ and $\phi$. In case of reflectivity data, the data is converted from the linear Z scale to the logarithmic dBZ scale by using the formula $dBZ = 10 \log_{10}(Z)$. The process may proceed to block 740.

At block 740, the process is queried as to whether each cell x of the MBR for the N radars has been determined. If the answer to the query is no, the process proceeds to block 745. If the answer to the query is yes, the process proceeds to block 750.

At block 745, the cell x may be set to cell x+1, and the process proceeds to block 640.

At block 750, the process ends.

Superposition of Vector Data

Figure 10A:
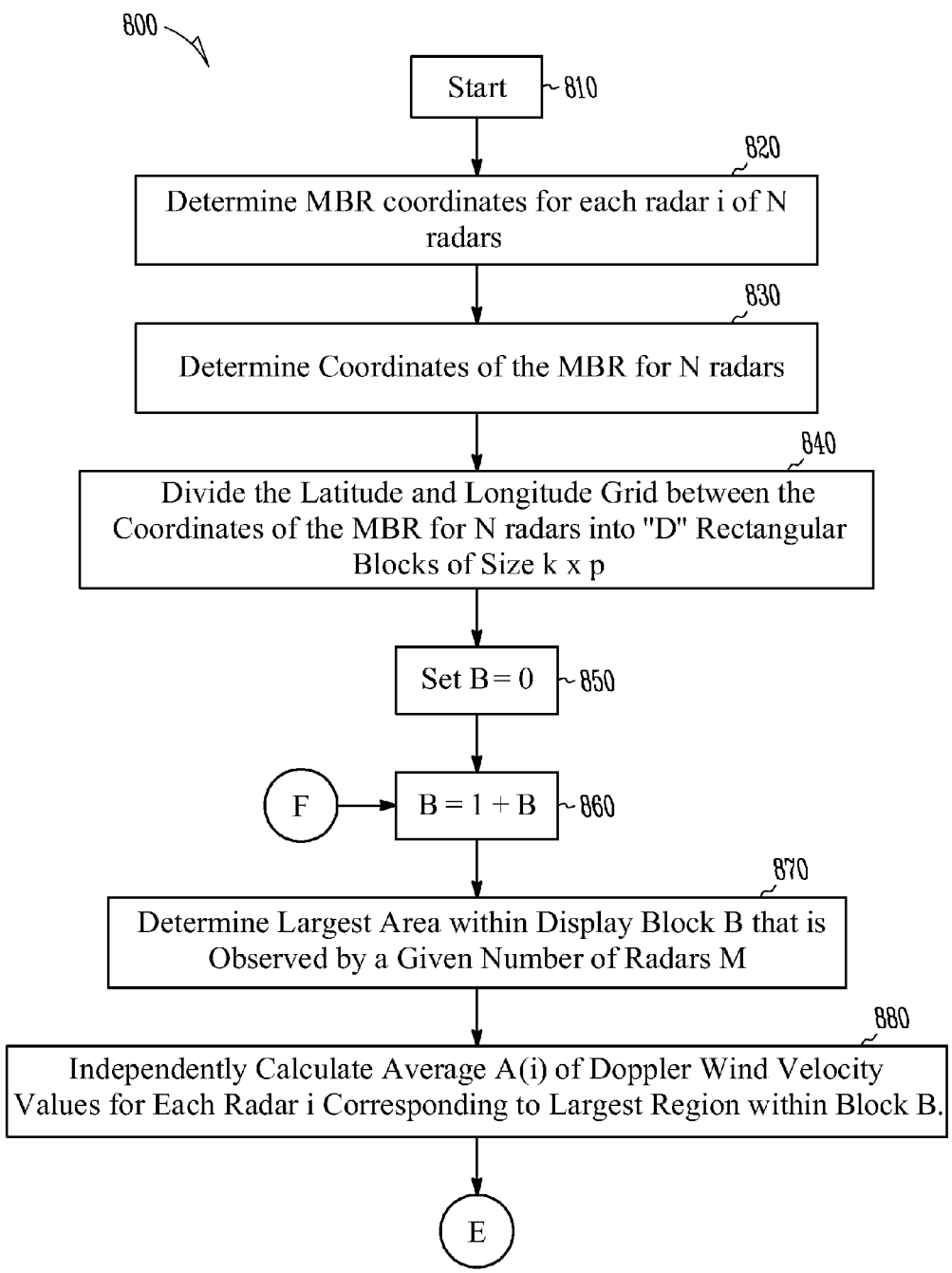
FIGS. 10A and 10B illustrate a process of extracting wind vector data according to an embodiment.
Figure 10B:
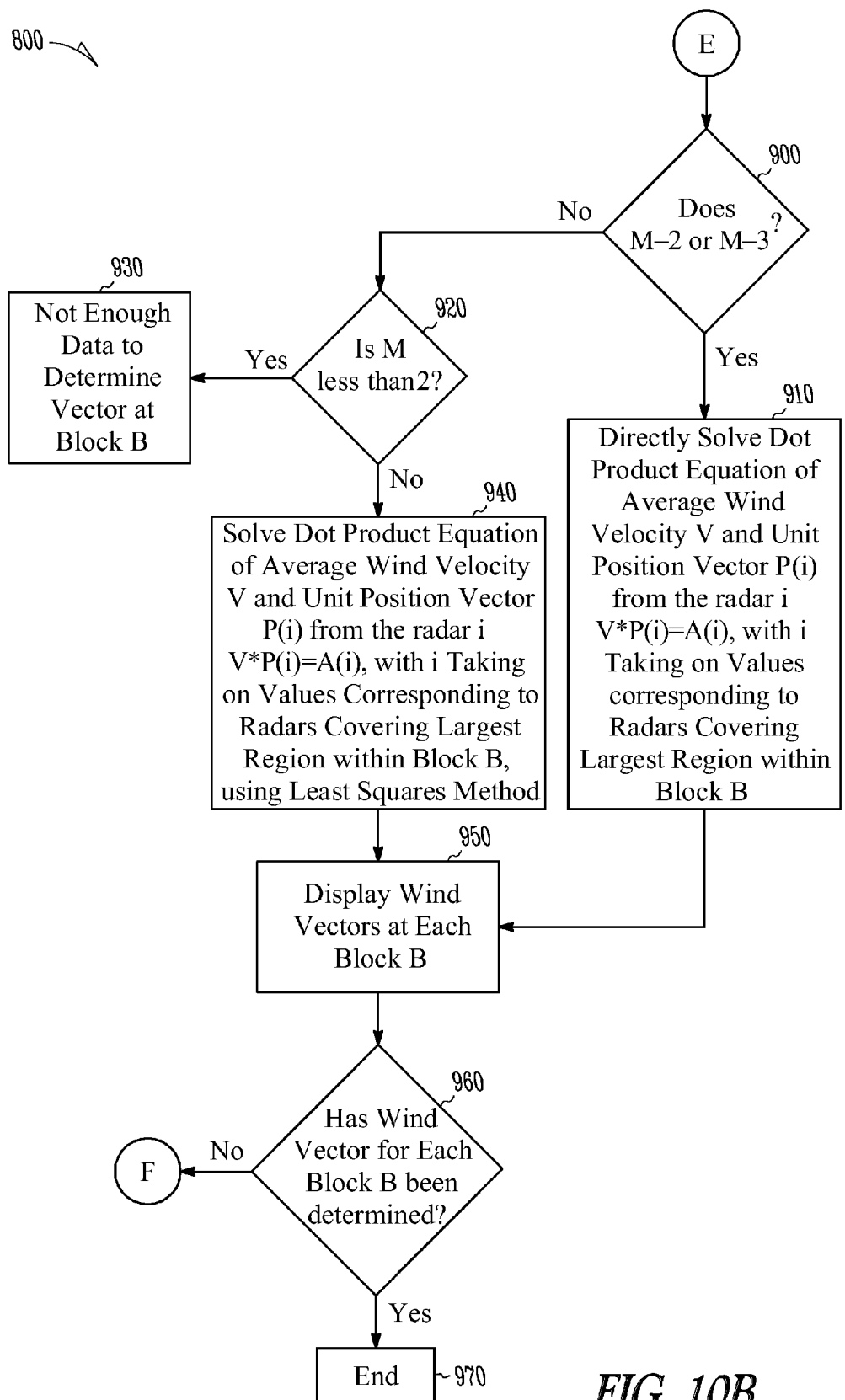

FIGS. 10A and 10B illustrate a process 800 of extracting wind vector data according to an embodiment. With vector data, a wind velocity vector may be constructed from the values observed by the overlapping radars. The wind velocity may be extracted in two or three dimensions, depending on the combination of radars for a given element in space. For example, if there are two overlapping radars, the velocity vector may be extracted in two dimensions, and in three dimensions for three or more overlapping radars at that given element in space. The vector is usually represented by an arrow, with its head pointing towards the direction of the wind vector and the length proportional to the magnitude of the wind vector. The vector may not be displayed at every point if coverage by two or more radars is not available at every point. A single vector may be displayed for a region, since displaying an arrow for each pixel on a display would make the display very crowded. For convenience and neatness of display, each vector may be displayed over a square or rectangular block region (called a display block) as discussed in more detail below.

In the process 800 described in FIG. 10A, let k×p be the size of the rectangular display block chosen for constructing vector data. If k is chosen to be equal to p then the display block may be square. The process to extract the wind vectors with data from N radars begins at block 810.

At block 820, the Minimum Bounding Rectangle (MBR) coordinates $((\lambda_{min_i}, \phi_{min_i}), (\lambda_{max_i}, \phi_{max_i}))$ may be determined for radar i ($1 \leq i \leq N$) using equation (7).

At block 830, coordinates $((\lambda_{min}, \phi_{min}), (\lambda_{max}, \phi_{max}))$ of the MBR for N radars may be determined using equation (8).

At block 840, the latitude and longitude interval between the coordinates $((\lambda_{min}, \phi_{min}), (\lambda_{max}, \phi_{max}))$ may be divided into "D" rectangular display blocks of size k×p, i.e. there are "D" rectangular display blocks in the grid. Further, the grid resolution parameters (dimensions of latitude-longitude cell) $\delta\lambda$ and $\delta\phi$, may be set to any specified value.

At block 850, an index B of the current rectangular display block may be set to 0. At block 860, set B=1+B.

At block 870, the largest area within the display block B that is simultaneously observed by a given number of radars M may be determined. The wind vector for the display block B in FIG. 6 may be determined. However, a display block may contain multiple regions, as illustrated by the display block B in FIG. 6, which includes regions 7, 8, 9 and 12. These regions are determined by considering latitude-longitude cells of dimension $\delta\lambda$ and $\delta\phi$ within the display block and determining the radar(s) which can observe each cell by applying the designated conditions. For a cell located at coordinates $(\lambda, \phi)$, the designated conditions include first checking if the inequality $\lambda_{min_i} \leq \lambda \leq \lambda_{max_i}$ is true, if yes then checking if the inequality $\phi_{min_i} \leq \phi \leq \phi_{max_i}$ is satisfied, and if yes, then further checking if the inequality $d((\lambda, \phi), (\lambda_i, \phi_i)) < EC_i(0°)$ is satisfied, where $EC_i(0°)$ may be retrieved from the first mechanism of CAPPI for the $i^{th}$ radar generated at block 330 in FIG. 7. The region with maximum area within that display block may be determined by counting the number of latitude-longitude cells that are observed by a given combination of radars, e.g. region 12 of FIG. 6 is observed by two (2) overlapping radars. The wind vector for the entire display block B may be constructed using the data from radars corresponding to that region, e.g. a 2-dimensional wind vector.

At block 880, the PPI scan-converted CAPPI scan line data from the $i^{th}$ radar for the cell located at $(\lambda, \phi)$ is obtained by first computing the east-west distance $d_{EWi}$ and north-south distance $d_{NSi}$ from the formulae $d_{EWi}=d((\lambda_i, \phi), (\lambda_i, \phi_i))$ and $d_{NSi}=d((\lambda, \phi_i), (\lambda_i, \phi_i))$ respectively, of x from the $i^{th}$ radar location. The PPI scan converted Doppler wind velocity data obtained and stored at block 485 of FIG. 8C, corresponding to the coordinates closest to $d_{EWi}$ and $d_{NSi}$, may be read. The average A(i) or $A_i$ of the Doppler wind velocity values for each radar i corresponding to the largest region within B may be calculated independently. For example, the average of the Doppler wind velocity values for each radar (i.e. radars III and IV) covering the part of region 12 enclosed in display block B of FIG. 6 may be calculated.

At block 900, the process 800 is queried as to whether the overlapping radars M may be equal to either 2 or 3. If the answer to the query is yes, the process proceeds to block 910. If the answer to the question is no, the process proceeds to block 920.

At block 910, the average wind velocity V may be obtained by solving the dot-product equation $V \cdot P(i) = A(i)$, where P(i) is the unit position vector from the origin of the radar i to the center of the block B, with i taking on the values corresponding to the radars covering the largest region within B. The process may proceed to block 950.

At block 920, the process is queried as to whether the overlapping radars M is less than 2. If the answer to the query is yes, the process proceeds to block 930. If the answer to the question is no, the process proceeds to block 940.

At block 930, there is not enough data to determine a 2-dimensional or 3-dimensional wind vector at block B. The vector data for this block B is not displayed.

At block 940, the average wind velocity V may be obtained by solving the dot-product equation $V \cdot P(i) = A(i)$ using the least squares method, where P(i) is the unit position vector from the origin of the radar i to the center of the block B, with i taking on the values corresponding to the radars covering the largest region within display block B. The process then proceeds to block 950.

At block 950, the wind vector is displayed as an arrow with its center located at the latitude and longitude coordinates corresponding to the center of the display block B. The process may proceed to block 960.

At block 960, the process is queried as to whether the wind vector for each block B has been determined. If the answer to the query is yes, the process proceeds to block 970. If the answer to the question is no, the process proceeds to block 860.

At block 970, the process ends.

The wind velocity may be extracted using radial velocities from two or more separately located radars scanning overlapping areas. The 3-dimensional velocity components of the wind may be obtained from the combination of three Doppler radars.

The position vector from the origin of the radar to the center of the block B may be calculated for the radars corresponding to the largest coverage region within display block B. The average of the values may be calculated independently for each radar covering that region. The dot product of the unit position vector and wind vector may give the radial component of velocity. However, because the vector is displayed over a display block, the radial component may be taken as the average of the values. These equations may be solved to obtain the actual vector in two or three dimensions depending on the number of overlapping radars. If the set of equations is written in matrix notation (equation (10)), then the least squares solution may be found by solving equation (11) where $A^T$ denotes the transpose of A.

$$AX = C \quad (10)$$

$$A^T A X = A^T C \quad (11)$$

In equations (10) and (11) X may represent a column vector for the wind velocity at display block B, A may be a matrix whose rows represent the unit position vectors of the radars observing display block B (i.e. the largest area within display block B), and C may be a column vector of the average values of the Doppler velocities for each radar over the display block B (i.e. the largest area within display block B).

Combined Scalar Data and Vector Data from Multiple Radars

Grids of multiple weather radars may generate data on scalar (reflectivity, spectrum width) as well as vector (wind velocity) parameters of the atmosphere. Because of the curvature of the earth's surface, the radar grid may not be coplanar. Scalar and vector data from multiple radars may be combined in a grid and displayed.

Computer System

Figure 11:
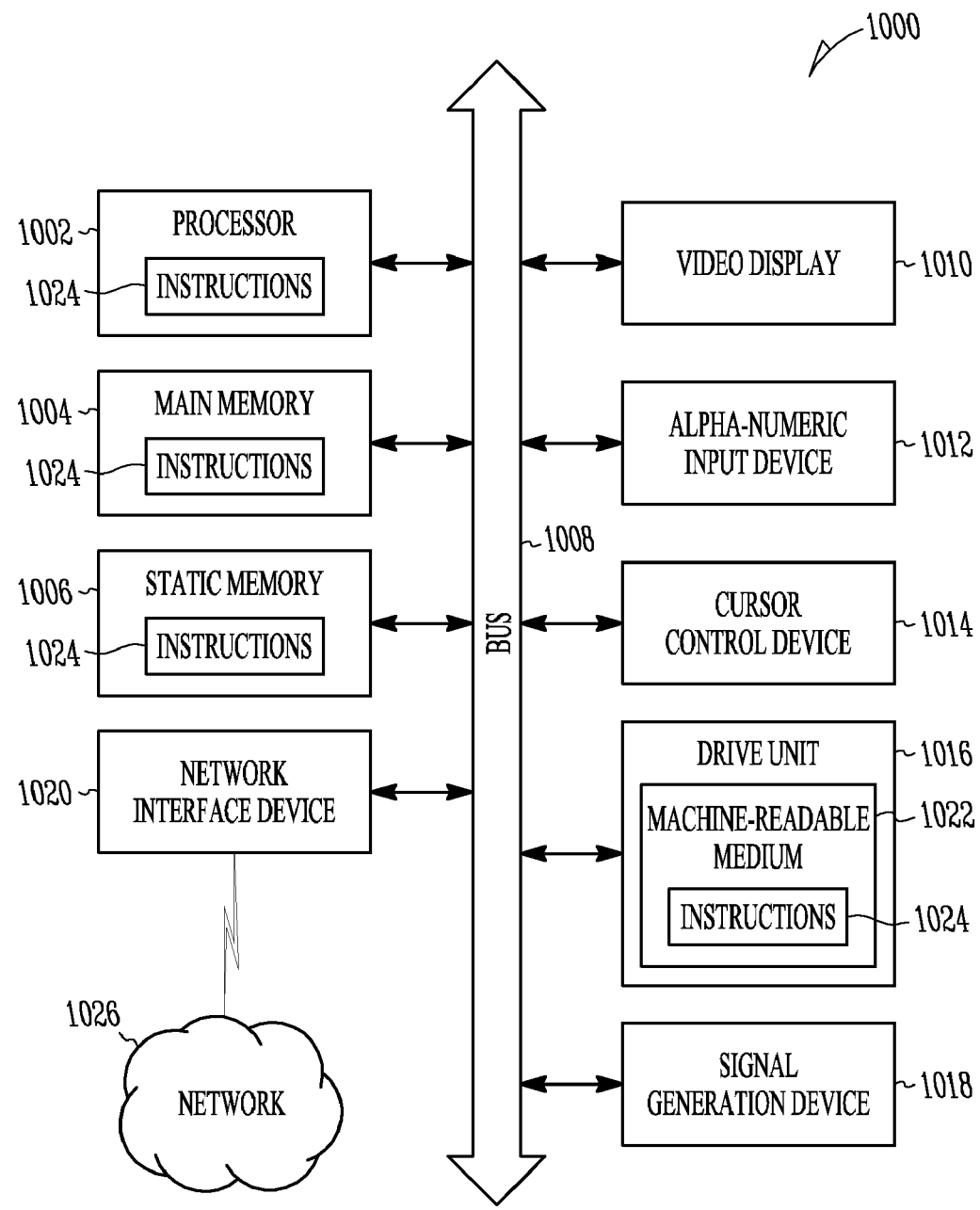
FIG. 11 shows a diagrammatic representation of a machine in the form of a computer system within which a set of instructions, for causing the machine to perform any one or more of the methodologies discussed herein, may be executed, according to an example embodiment.

FIG. 11 illustrates a diagrammatic representation of a machine in the example form of a computer system 1001 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a mobile device, a palmtop computer, a laptop computer, a desktop computer, a control system, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 1001 includes the processor 103/1002 (e.g., a central processing unit (CPU), a graphics processing unit (GPU), or both), a main memory 1004 and a static memory 1006, which communicate with each other via a bus 1008. The computer system 1001 may further include a video display unit 1010 (e.g., a liquid crystal display (LCD) or a cathode ray tube (CRT)). The computer system 1001 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The instructions 1024 may also reside, completely or at least partially, within the main memory 1004, the static memory 1006, and/or within the processor 1002 during execution thereof by the computer system 1001. The main memory 1004 and the processor 103/1002 also may constitute machine-readable media. In an additional embodiment, the mechanism (such as the look up table) is not stored, but rather a processor or additional processor is used to generate the weights substantially in real-time. This additional embodiment may be useful, e.g. where processing speed is more readily available as compared with memory.

The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The instructions 1024 may further be transmitted or received over a network 1026 via the network interface device 1020.

Embodiments may be utilized by running the program on a digital computer that receives the appropriate type of data (scalar and vector) from a number of overlapping radar fields to generate a CAPPI display on the monitor in quasi-real-time. Embodiments are also useful for generating CAPPI display from pre-recorded radar data available from public or private data archives. The display unit 1010 may be of any resolution and embodiments may be implemented without addition of any special hardware to a computer.

The mechanism(s) may also be implemented on a Digital Signal Processing (DSP) chip or any other computer board. The mechanism(s) is(are) implemented in a high level programming language for ease of coding, though they may also be implemented in other types of programming languages, e.g. in assembly or machine languages to achieve higher processing speed and reduced memory overheads. Due to the versatile nature of the mechanism, the technique may be embedded in hardware for CAPPI display of data from radar receiver during real-time operation.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

Using the embodiments of methods and systems described herein, a horizontal slice is taken through the radar volume scan data at constant altitude above the earth surface using Constant Altitude Plan Position Indicator (CAPPI). Weather radar systems often deteriorate the spatial sampling of the scan volume by skipping certain elevation angles to reduce time used for scanning the region around the radar. This results in gaps in the CAPPI data, which have been filled in the embodiment using an interpolation scheme. Other CAPPI schemes may utilize a nearest neighbor approach, which may introduce artifacts into the display, including sharp jumps or boundaries between annular segments of the display. Embodiments determine the display parameter at the CAPPI surface by making a weighted interpolation of data from adjacent scan elevations to obtain a smoother and more accurate CAPPI display. The CAPPI scan line data constructed along each azimuth angle may be scan converted to computer display coordinates.

In systems described herein, the elevation from the ground of the CAPPI surface may be first specified, and CAPPI data for increments in EC between the vertical and the highest elevation angle of radar is taken from the radar volume scan data for the highest elevation angle. The CAPPI data for increments in EC between the lowest elevation angle and 0° (i.e. horizontal) is taken from the radar volume scan data for the lowest elevation angle. The length of the arc EC for each elevation angle is computed. These pre-computed arc lengths may be used for determining the adjacent elevation angles corresponding to each increment in EC; the scheme may avoid computation of adjacent elevation angles for each increment in EC. Further, interpolation may add little overhead due to calculation of weights and weighted average of weather data from adjacent elevation angles.

Coverage by multiple radars may help in improving the quality of scalar radar data such as reflectivity, which corresponds to rainfall intensity. Multiple Doppler radar coverage may also help in retrieving the wind vectors which may not be observed directly by single Doppler radars. The multi-radar data combining method or system may handle scalar data as well as vector data.

Any number of radar fields overlapping at a given point may be handled using the method(s) described herein. The number of overlapping radars at a given element may be determined dynamically using a distance measure bounded by a value depending on the altitude of the element from the surface of the Earth. For scalar data, the data from the overlapping radars may be averaged and displayed on a CAPPI (Constant Altitude Plan Position Indicator) projection. For vector data, the projections corresponding to the individual radar radial directions may be used to reconstruct a true vector at the radar resolution cell. The vector data may be averaged over a display box and may be represented by an arrow for each box. For two overlapping radars, the vector is calculated as a planar (2-D) vector. With 3 overlapping radars, an exact solution of the 3-D vector is obtained. If the overlapping radars are more than 3 then a 3-D vector is reconstructed on a least-squares basis. The software may automatically determine the number of overlapping radars and employ the appropriate reconstruction algorithm.

Individual radar data may be generated and archived in a radar-centric coordinate system. When combining data from multiple radars, the data may be converted to a universal coordinate system that may increase functionality and efficiency. In embodiments, a universal latitude-longitude grid for displaying the data generated at constant altitude may be used.

In embodiments described herein, a mechanism, such as a graph, a look-up table (LUT), a set of equations, and/or an algorithm may be used for calculating or storing the arc lengths EC for each radar beam elevation $\phi$, and weights and ranges for each increment in EC for a given altitude H from ground. For ease of explanation, the mechanism is a look up table (LUT) in these embodiments. The LUT for ranges and weights (i.e. the second and third mechanisms) is implemented as one dimensional arrays indexed by the number of the increments in EC from the vertical, while the LUT for lengths of EC for each elevation angle is indexed by the elevation number. The LUT can be computed with minimal processing overhead and can be accessed quickly. The technique may be efficient because the memory used for storing the LUTs may be minimal and an efficient calculation of the lengths may add less processing overhead. This technique may not recompute the LUT unless the altitude or the elevation angles of the radar data change. Since the elevation angles of the radar data are less likely to change, multiple LUTs may be computed and stored for different altitudes. The use of LUTs enables high performance with minimal memory overhead and memory may be less expensive as compared to the increase of the processing speed of hardware. It also enables the CAPPI data computation to be carried on processors of lower capability such as those in airborne computers.

CAPPI may avoid issues associated with PPI by picking constant altitude data from different elevation scans. However, because CAPPI includes data from all elevation scans in the radar volume, processing in some embodiments may take considerably longer than PPI displays.

As described herein, the CAPPI data generation process described may be compatible with any PPI display algorithm or device that may handle any user-specified rotation, zooming, magnification, distance interval, and sector selection. This scheme may provide additional features for displaying CAPPI. The CAPPI data generated using these embodiments are indexed by the horizontal distance (along constant-height arc) from the vertical through the radar, and the azimuth angle, and may be converted to any other coordinate systems, e.g. latitude-longitude, Cartesian. Embodiments are suitable for generating CAPPI data for use with techniques superposing CAPPI data from overlapping radars, where the radar data should be converted from the individual radar coordinates to a universal grid system. CAPPI, generated using this interpolation scheme, suits viewing specifications and may be more accurate and continuous than data generated using another scheme, for example, a nearest neighbor scheme.

Embodiments described herein may be used with the presentation and display of weather radar data by users such as meteorologists, air traffic controllers, pilots, TV weather broadcasters, and disaster monitors. Embodiments can be licensed to companies working on general radars, weather radars, imaging radars, meteorological data products and PPI displays.

Overlapping radar sites may increase reliability and may fill the void of non-operational sites. Such an overlapping network may offer a superior quality of coverage and the observed information may be more precise. For example, a single radar may have a blind azimuth that an adjacent radar may cover. Multiple radars may provide continuity and redundancy in case of a failure. Where a single radar surveillance system may experience catastrophic failure, multiple radar systems may provide for graceful degradation of overall performance.

A large number of radar sites are distributed across the world, e.g. US Weather Surveillance Radar-1988 Doppler (WSR-88D), also known as Next Generation Radar (NEXRAD) network. These sites operate independently, but the ranges of these radar sites may overlap. The NEXRAD network may provide information associated with monitoring severe weather and issuing storm warnings, flash flood warnings.

Gridded data may allow various WSR-88D users to benefit from a wide-variety of products and displays (flexible horizontal or vertical cross sections) that may be easily extracted from multiple radar analysis grids. Further, data fusion, i.e. the process of combining radar data with information from other sources e.g. satellite, may be performed for gridded radar data. The gridded data may provide a more complete depiction of storm and precipitation events than using a single radar.

A mosaic of data combined with radar images may be constructed from overlapping radars into a single image to potentially render a more accurate display.

The following issues may be addressed using embodiments herein: Variability of the number of radar coverage volumes overlapping at a given location. These may range from 0 (no radar coverage) or 1 (coverage by a single radar) to coverage by several radars; variability of the size and orientation of the radar resolution volumes of multiple radars at a given location; the conical nature of the individual radar beam scanning surfaces for different elevation angles, and the non-overlap of these conical surfaces from adjacent radars; non-contiguous stacking of the scanning radar beams, i.e. presence of significant gaps between the scanning elevations of a radar, especially at the higher elevation angles; the curvature of the earth, which makes even the flat, zero-elevation scanning planes of adjacent radars to be non-overlapping, and uses additional formulation for transforming the coordinates from one radar to another, or to a common set of coordinates.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R.§1.74(b) to allow the reader to quickly ascertain the nature and gist of the technical disclosure. The Abstract is submitted with the understanding that it will not be used to interpret or limit the scope or meaning of the claims.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. The figures are merely representational and may not be drawn to scale. Certain proportions thereof may be exaggerated, while others may be minimized. Accordingly, the specification and drawings are to be regarded in an illustrative rather than a restrictive sense.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment. One skilled in the art will recognize that other configurations are available and other methods of manufacture may function as well without exceeding the scope of the disclosed subject matter.

While particular embodiments have been illustrated and described, they are merely examples and a person skilled in the art may make variations and modifications to the embodiments described herein without departing from the spirit and scope of the presently disclosed subject matter.

The invention claimed is:

1. A system to reduce the data from a plurality of radars to a common universal latitude-longitude coordinate frame, the system comprising:
   radar data received from the plurality of radars, the plurality of radars at separate geographical locations and having one or more overlapping radar regions;
   a processor to reduce the data from the plurality of radars to a common universal latitude-longitude coordinate frame having a constant altitude above the earth's surface that includes multiple data cells, and to combine data from multiple radars for at least one cell in the one or more overlapping radar regions and to fill in gaps in the coordinate frame using interpolation; and
   a memory to store an arc length for each radar beam elevation, and a weight and a range for each increment in each arc length for the constant altitude above the earth's surface.

2. The system of claim 1 further comprising a single image display of a group selected from combined radar data in the one or more overlapping regions and individual radar data in the one or more overlapping regions.

3. The system of claim 1 wherein the processor is to divide a latitude-longitude interval, spanning fields of view of the plurality of radars, into a plurality of blocks.

4. The system of claim 3 wherein a wind velocity is obtained, at one of the blocks, in three dimensions when there are at least three overlapping radars observing one of the plurality of blocks.

5. The system of claim 4 wherein the processor receives radar data from more than three overlapping radars observing one of the plurality of blocks, and where the processor uses a least squares method to calculate the wind velocity, at the one of the blocks, in three dimensions using the radar data received from more than three overlapping radars.

6. The system of claim 1 wherein there are one or more coordinates associated with the common universal latitude-longitude coordinate frame, wherein at one of the one or more coordinates there are no overlapping radar regions.

7. The system of claim 1 wherein the radar data includes scalar data, and the scalar data obtained at one radar resolution cell is averaged when there are overlapping radar regions at the one radar resolution cell.

8. The system of claim 1 wherein the memory to store an arc length for each radar beam elevation, and a weight and a range for each increment in each arc length for the constant altitude above the earth's surface comprises a look-up table.

9. A system to reduce the data from a plurality of radars to a common universal latitude-longitude coordinate frame, the system comprising:
   means for receiving radar data from the plurality of radars, the plurality of radars having one or more overlapping radar coverage regions;
   means for determining latitude-longitude coordinates associated with the radar data;
   means for combining the data, in latitude-longitude coordinates, in the one or more overlapping regions to provide a constant altitude plan position indicator for a desired altitude above the surface of the earth; and
   a memory to store an arc length for each radar beam elevation, and a weight and a range for each increment in each arc length for a constant altitude above the earth's surface.

10. The system of claim 9 wherein the means for combining the data in latitude-longitude coordinates includes a processor.

11. A method to reduce the data from a plurality of radars to a common universal latitude-longitude coordinate frame, the method comprising:
   receiving radar data from the plurality of radars, the plurality of radars having one or more overlapping radar regions;
   determining latitude-longitude coordinates associated with the radar data having a constant altitude above the earth's surface;
   combining the data in latitude-longitude coordinates corresponding to at least one cell in the one or more overlapping regions;
   calculating an arc length for each radar beam elevation, and a weight and a range for each increment in each arc length for the constant altitude above the earth's surface; and storing the arc length for each radar beam elevation, and the weight and range for each increment in each arc length for the constant altitude above the earth's surface in a look-up table.

12. The method of claim 11 further comprising displaying a single mosaiced image including combined radar data in the one or more overlapping regions and individual radar data in the one or more overlapping regions and a range weighted interpolation of cells to cover gaps in radar data.

13. The method of claim 11 further comprising dividing an interval of the latitude-longitude coordinates associated with the radar data into a plurality of blocks.

14. The method of claim 13 further comprising obtaining, at one of the blocks, a wind velocity in three dimensions when there are at least three overlapping radars observing one of the blocks.

15. The method of claim 14 further comprising receiving radar data from more than three radars for at least one block and using least squares method to calculate the wind velocity from the more than three overlapping radars observing one of the blocks.

16. The method of claim 13 further comprising obtaining, at one of the blocks, a wind velocity in two dimensions when there are at least two overlapping radars observing one of the blocks.

17. The method of claim 11 wherein the radar data includes scalar data, the method further comprising averaging the scalar data obtained at one of the coordinates, when there are overlapping radar observations at the one of the coordinates.

18. The method of claim 11 comprising:
automatically determining a number of the plurality of radars observing a given location.

19. A computer-readable medium having program instructions to perform a method to reduce the data from a plurality of radars to a common universal latitude-longitude coordinate frame, the method comprising:
receiving radar data from the plurality of radars, the plurality of radars having one or more overlapping radar regions having a constant altitude above the earth's surface;
determining latitude-longitude coordinates associated with the radar data;
combining the data in latitude-longitude coordinates corresponding to at least one cell in the one or more overlapping regions;
calculating an arc length for each radar beam elevation, and a weight and a range for each increment in each arc length for the constant altitude above the earth's surface; and
storing the arc length for each radar beam elevation, and the weight and range for each increment in each arc length for the constant altitude above the earth's surface in a memory.

* * * * *